United States Patent [19]
Wrey

[11] Patent Number: 6,064,400
[45] Date of Patent: May 16, 2000

[54] VIDEO IMAGE PROCESSING SYSTEM

[75] Inventor: Colin John Wrey, Newbury, United Kingdom

[73] Assignee: Quantel Limited, Newbury, United Kingdom

[21] Appl. No.: 09/021,605

[22] Filed: Feb. 10, 1998

[30] Foreign Application Priority Data

Feb. 13, 1997 [GB] United Kingdom .................... 9702959

[51] Int. Cl.[7] ...................................................... G06F 15/00
[52] U.S. Cl. ............................................................ 345/440
[58] Field of Search .................................... 345/429, 431, 345/441, 442, 440, 121, 141, 142

[56] References Cited

U.S. PATENT DOCUMENTS 4,318,096  3/1982  Thornburg et al. ..................... 345/440
4,360,831  11/1982  Kellar ...................................... 358/183

*Primary Examiner*—Phu K. Nguyen
*Attorney, Agent, or Firm*—Cooper & Dunham LLP

[57] ABSTRACT

A video image processing system 1 comprises a monitor 5, a stylus/touch tablet device 6 and a processor 3, 7, 30 for processing frames of a video clip. The processor is responsive to the stylus/touch tablet to generate data representing a time-based function defining the manner in which a parameter of the video clip varies with the time of the clip. The processor is arranged to generate data for display on the monitor of a graph representing the plot of the function. The processor also responds to operation of the stylus/touch tablet device by manipulating the graph data for display so as to zoom into or out from a portion of the plot.

21 Claims, 3 Drawing Sheets

VIDEO IMAGE PROCESSING SYSTEM

The invention relates to a video image processing system.

Electronic graphic or image systems in which the painting or drawing of a colour image can be simulated, or a portion of one image can be merged into another by electronic means are well known. One such graphic system is described in our British patent number 2,089,625 and corresponding U.S. Pat. No. 4,514,818, the teachings of which are incorporated herein by reference. This system includes a user operable input device which may be used by the user to select from a range of colours and a range of intensities and to choose from a set of notional drawing implements for use in the painting or drawing.

When a colour is chosen by the user, values representing the components of the selected colour are stored in a colour register. An implement is chosen by selecting from among different implement representations displayed on a display screen and the selected implement is defined by parameters conforming to a 3-dimensional surface representing the profile of the implement. Generally speaking the implement profile will have a high centre falling away to a lower value toward the periphery of the profile although other profiles may, of course, be defined. The implement profile represents the notional distribution of colour which would be applied by the implement to the image over the area of the image which it covers.

The user operable input device is preferably a touch tablet and stylus combination. The touch tablet is arranged to generate position signals designating the position of the stylus relative to the touch tablet when the stylus is brought into proximity. When the stylus is applied to the touch tablet a pressure signal representing the pressure applied via the stylus to the touch tablet is output from the stylus and stored in a pressure signal register. For some implements, representing say paint brushes, position signals are allowed to be generated for each movement of the stylus by the distance between picture points or similar distance, whilst for other implements, say air brushes, position signals are generated at regular time intervals, even if the stylus is held stationary on the touch tablet.

When a position signal is produced, new video signals (pixels) are derived for every picture point in the patch covered by the selected implement. An image store is provided and each new pixel is written at the appropriate picture point in the store. Such new pixels are derived by a processing circuit in accordance with the selected colour data and the distribution of the selected implement, and in response also to the pressure applied to the stylus and to the value of the pixel previously stored at the respective picture point in the store.

The user, who it is envisaged would normally be an artist lacking experience in the use of computer based systems, paints or draws by choosing a desire colour and implement and then manipulating the stylus, causing the touch tablet to generate a series of position signals which define the path or positioning of the stylus. The processing circuit reads pixels from the image store for a patch of picture points in response to each position signal and these pixels are blended by the processor with signals representing the chosen colour in proportions depending upon the respective values of the brush profile and pressure. The blend is then written back to the picture store replacing the pixels previously stored therein.

In general, the blending process is carried out a number of times for each picture point in the image store whether the implement is moving or stationary (assuming in the case of the moving implement that the patch covered by the implement is larger than the spacing between picture points). The final proportion will depend on the number of processing operations performed per pixel.

To enable the user to observe his creation, the stored picture is read repeatedly and the pixels are applied to a TV-type colour monitor, so that the build-up of the picture can be observed. Of course such systems are not limited to TV-type formats and any suitable video format may be adopted. The system described avoids the problem of jagged edges in the image, an unpleasant stepping appearance normally associated with lines not lying horizontally or vertically in a raster display.

Another system which enables a user to perform picture composition in addition to painting is described in our British Patent No. 2113950 and corresponding U.S. Pat. No. 4,602,286, the teachings of which are also incorporated herein. In this system stores are provided for storing data representing two independent pictures and a control image or stencil. A stencil is produced for example by "drawing" data into the control image store. The stencil data is used to control the combining of the data representing the two independent pictures to produce data representing a composite picture. The data representing the composite picture is output continuously for display of the picture on a monitor. Once the user is satisfied with the displayed composite picture the composite data is stored permanently for subsequent processing or printing for example.

Such image systems can be adapted for use in processing frames of a video clip by providing a bulk store for storing data representing the frames that comprise the video clip and arranging for the frames to be transferred to the image or frame store for processing. The processing of a clip can be facilitated by arranging for the same or similar processing to be applied to each frame of the clip. In some situations, for example colour correction, the same processing can be applied to every frame in the clip, but in other situations the processing parameters will vary from frame to frame.

Where the parameters vary on a frame-by-frame basis it is often possible to define the changing parameters as respective time based functions. One way in which time based functions may be defined is by way of user manipulation of a graphical representation of the function displayed on the monitor. The function is represented by a line or plot and can be varied by manipulation of an input device which causes a cursor to attach to a point on the plot and to drag the point to a new location within the graph. Further manipulation of the input device causes the point to be detached from the cursor. A new plot is then calculated that will pass through the point in its new position and through previously defined points on each side thereof. The plot may be calculated by any of the wide range of well known curve plotting algorithms. In this way, the user is able to define the function of one or more processing parameters.

The invention aims to provide an improved video image processing system by facilitating graph and plot manipulation.

According to one aspect of the invention there is provided a video image processing apparatus for processing frames of a video clip, the apparatus comprising: a monitor; a user operable input device; and a processor responsive to said user operable input device for generating data representing a time-based function defining the manner in which a parameter of the video clip varies within the time of the clip, for generating data for display on the monitor of a graph representing the plot of the function, and for manipulating the graph data for display so as to zoom into or out from a portion of the plot including a point of area of interest in the graph.

According to another aspect of the invention there is provided a video image processing method for processing frames a video clip, the method comprising: generating data representing a time-based function defining the manner in which a parameter of the video clip varies within the time of the clip, generating data for display of a graph representing the plot of the function, and manipulating the graph data for display so as to zoom into or out from a portion of the plot including a point of area of interest in the graph.

The invention also provides a system in which a graph representing a function is displayable and a zooming operation can be performed into and out from the graph, the graph fading between one scale and another during the zooming operation.

The above and further features of the invention are set forth with particularity in the appended claims and together with advantages thereof will become clearer from consideration of the following detailed description of an exemplary embodiment of the invention given with reference to the accompanying drawings.

Figure 1:
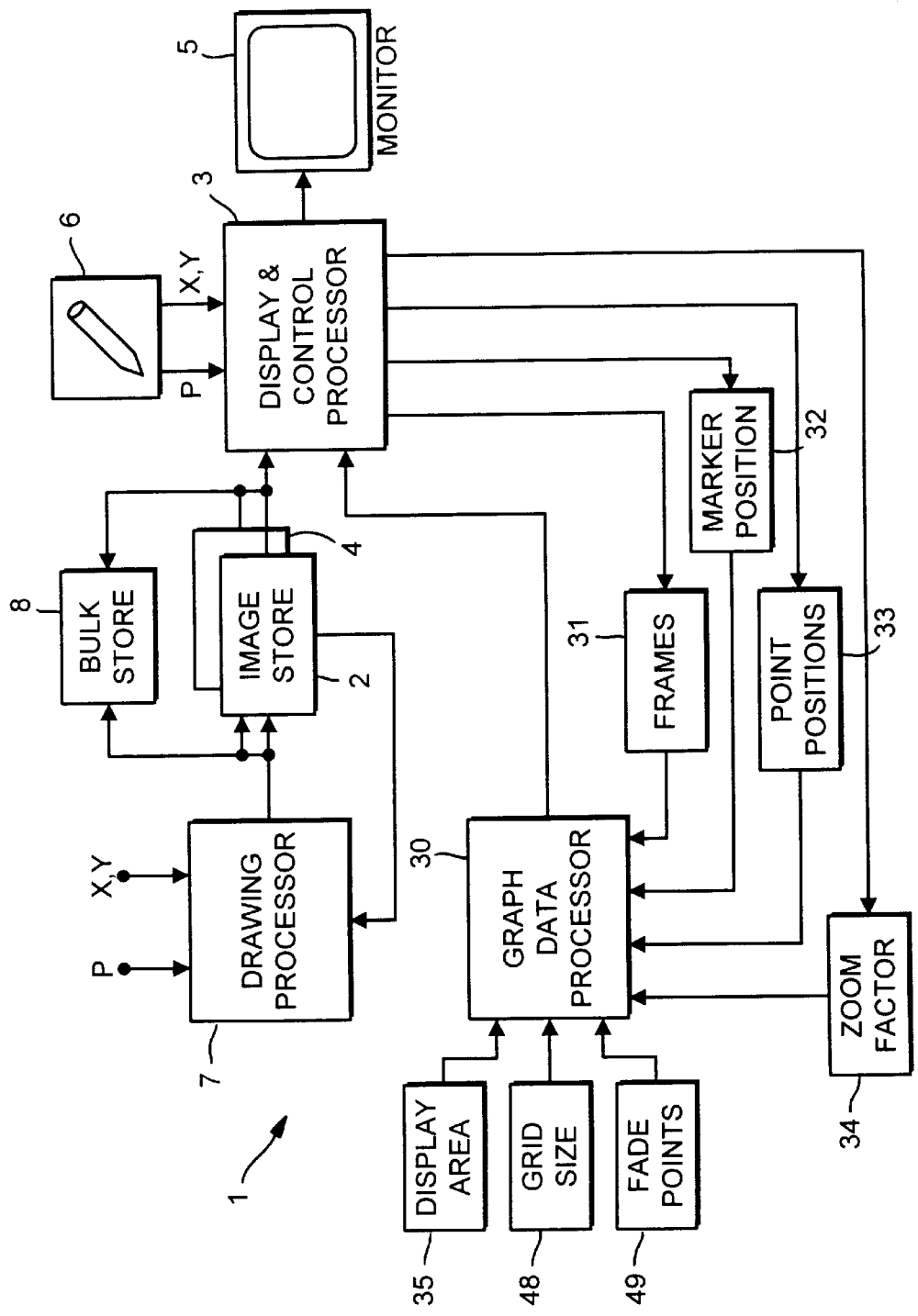
FIG. 1 is a schematic block diagram of a system embodying the invention.

Referring now to FIG. 1 of the accompanying drawings, a video image processing system, indicated generally at 1, comprises a first image store 2 for storing data defining a first image, a display & control processor 3, a second image store 4, and a monitor 5. The contents of the first image store 2 are read continuously in a raster sequence via a serial access port by the display & control processor 3 and the thus scanned data is output by the display & control processor 3 for display of the image represented thereby on the monitor 5.

The system 1 also comprises a user operable stylus/touch tablet device 6 by which the user can modify the image data in the store 2, and hence the image represented thereby. As the stylus is drawn across the touch tablet signals representative of the instantaneous position X, Y of the stylus are output therefrom to the display & control processor 3 and to a drawing processor 7. The display & control processor 3 and the drawing processor 7 are shown as separate entities in order to facilitate understanding by simplifying the following explanation. In practice the two processors 3, 7 may be provided as a single processing unit.

The drawing processor 7 is arranged among other things to convert the instantaneous X, Y position information from the stylus/touch tablet 6 into data representing an equivalent location in the store 2. As the user moves the stylus on the touch tablet the position data X, Y is continuously generated by the touch tablet 6 and delivered to the drawing processor 7 where it is converted into x, y data identifying patches of store addresses in the store 2. Each patch of addresses is centred over the x, y location in the store equivalent to the corresponding X, Y position data generated by the touch tablet.

The stylus of the stylus/touch tablet device 6 also includes a pressure sensor that outputs a pressure related signal P. Modern stylus touch tablet devices are also capable of generating data defining the orientation (twist) and defining the angle of the stylus in relation to the touch tablet. These parameters may be output as well as or instead of the pressure data for use by the processors 3, 7.

Notional, drawing implements are predefined in is the system 1 and are selectable by the user from a menu of options (not shown) generated by the display & control processor 3 and displayed on the monitor 5. When the user selects a particular implement, data defining a continuous three dimensional shape covering a patch of pixels and representing the profile of the implement as described in our above mentioned patents, is used by the drawing processor 7 together with data representing for example a user selected colour to "paint" an image into one of the image stores 2, 4.

A colour image may be "painted" into either of the image stores 2, 4 as described in our aforementioned British Patent 2089625 and U.S. Pat. No. 4,514,818. Alternatively, image data from a bulk store 8 such as a video tape recorder or a frame random access store of the kind described in British Patent Application No. 9226199.9 for example, or another source such a camera or a scanner may be loaded directly into either or both of the two image stores 2, 4 and the image can then be retouched by "painting" colour data into the store.

The system is also operable to interpolate foreground image data in say the first image store 2 and background image data in say the second image store 4 using control image data in a stencil store (not shown) as an interpolation coefficient to produce data representing a composite image, as described in our aforementioned British Patent 2113950 and corresponding U.S. Pat. No. 4,602,286 which are incorporated herein by reference.

These painting and compositing operations may be repeated for each frame in a video clip so as to produce a clip in which the video image has been (say) retouched or colour corrected, or which comprises a combination of selected portions of two or more initial video clips. In order to facilitate such operations as are performed throughout a video clip, the display and control processor 3 is arranged to respond to certain manipulations of the stylus on the touch tablet by generating data for display on a portion of the monitor 5 of a graph representing the manner in which a selected parameter is changed over time.

Figure 2:
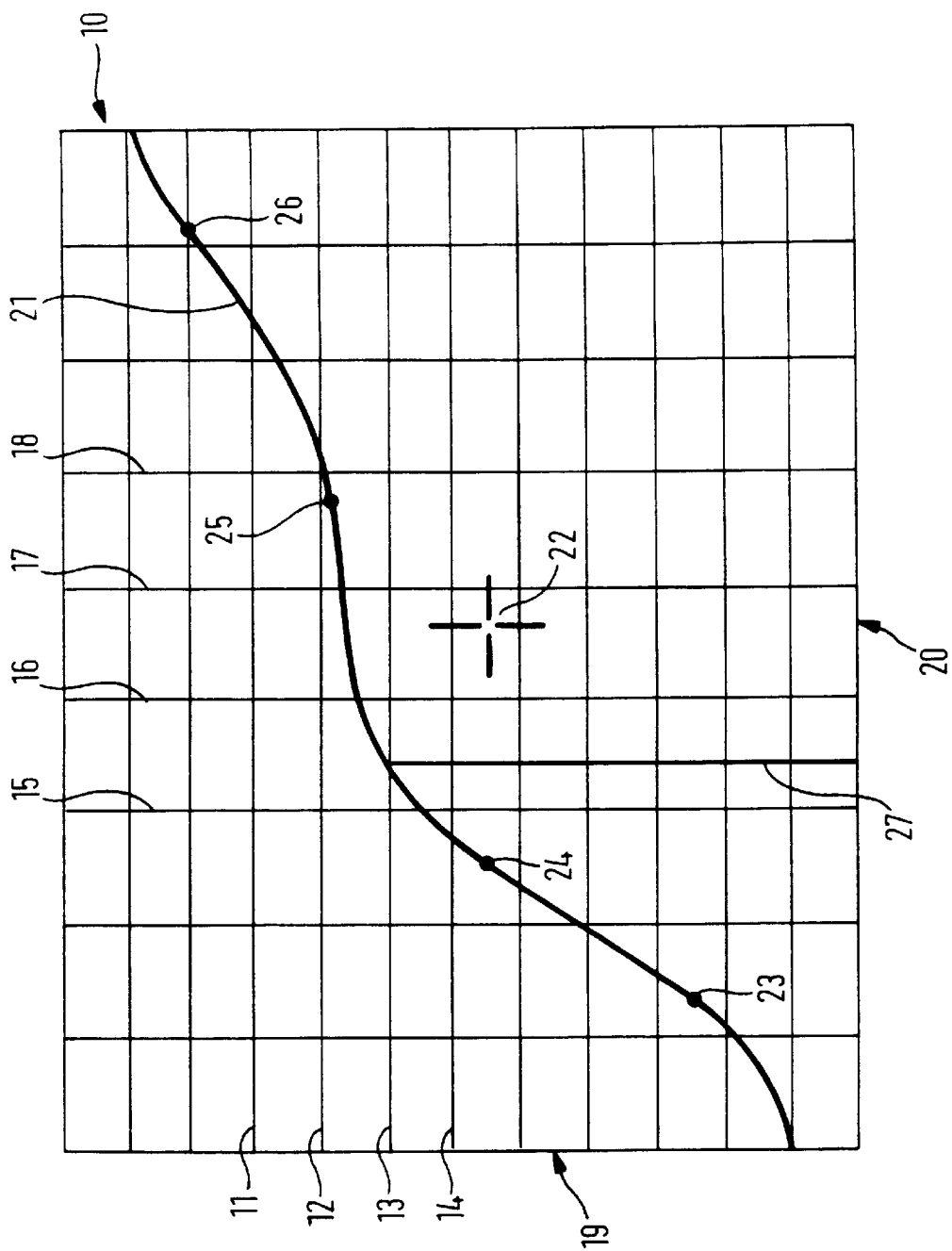
FIG. 2 is an example of a graph displayable by the system and representing a time varying function.

An example of such a graph is shown in FIG. 2 of the accompanying drawings. The graph indicated generally at 10 comprises a grid of horizontal lines 11 to 14 and vertical lines 15 to 18. The vertical axis 19 of the graph represents the selected parameter divided into appropriate units by the horizontal lines 11 to 14. The horizontal axis 20 of the graph represents time divided into appropriate units (namely a number of frames) by the vertical lines 15 to 18. A plot 21 on the grid represents the manner in which the selected parameter varies with time.

The display & control processor 3 is arranged to generate data representing a cursor 22 which is displayed on the monitor 5 when the stylus is brought into the proximity of the touch tablet. Manipulating the stylus on the touch tablet causes the cursor 22 to move correspondingly on the monitor 5 and thus over the graph 10 displayed thereon. Placing the cursor 22 over a point on the plot 21 by way of movement of the stylus and then applying pressure to the stylus on the touch tablet causes the control processor 3 to respond by marking the point as a selected point, such as points 23 to 26 in FIG. 2. If pressure is maintained further movement of the stylus causes the selected point to move with the cursor 22. When pressure is released the control processor 3 responds by redefining the position of the point as the location at which the pressure was released. The plot 21 is then recalculated using any of the many well known curve fitting algorithms so that it passes through all of the selected points.

Normally the graph 10 is displayed together with a menu of control options (not shown) in a lower portion of the monitor 5 and the "current" frame in the clip is displayed in the remaining upper portion of the monitor 5. The clip may be tens, hundreds or even thousands of frames in length. The display & control processor 3 is therefore arranged to display on the graph 10 a current frame marker 27 identifying the position in the clip of the frame currently displayed on the upper portion of the monitor 5. The user is able to scroll through frames of the clip by moving the cursor 22 over the current frame marker 27 (by manipulation of the stylus) and then attaching the cursor 22 to the marker 27 by applying pressure to the stylus on the touch tablet. With the pressure maintained subsequent horizontal movement of the stylus on the touch tablet is interpreted by the control processor 3 as a command to move the current frame marker to a new position on the graph. At the same time corresponding command signals are sent from the control processor 3 to the bulk store 8 (via command lines not shown in FIG. 1) so that when the pressure is removed the upper portion of the monitor displays the frame corresponding to the new position of the current frame marker 27 on the graph 10.

Returning now to FIG. 1, the system 1 further comprises a graph data processor 30 (which may be part of a processing unit with the processors 3 and 7) which processes data relating to (among other things) the number of frames in the clip, the position of the current frame marker 27 and the position of the selected points 23 to 26. This data together with data defining a zoom factor (to be described hereinbelow) is generated by the display & control processor 3 and stored in respective registers 31 to 34 for use by the graph data processor 30. The area available for display of the graph 10 is generally fixed (and is in any case known in advance) and so data defining the display area is preloaded into a display area register 35. A problem with using a fixed area to display the graph is that it can be very difficult in the graph to distinguish between adjacent frames in the clip. If the clip comprises only ten or twenty frames there will be a relatively large horizontal distance between adjacent frames in the graph. However, if the clip comprises one or two thousand frames (forty or eighty seconds of PAL video) the distance between adjacent frames in the graph will be negligible and a relatively small horizontal movement of the cursor on the graph may correspond to many tens or even hundreds of frames. Such scaling does not facilitate editing or other processing of a large video clip.

Figure 3:
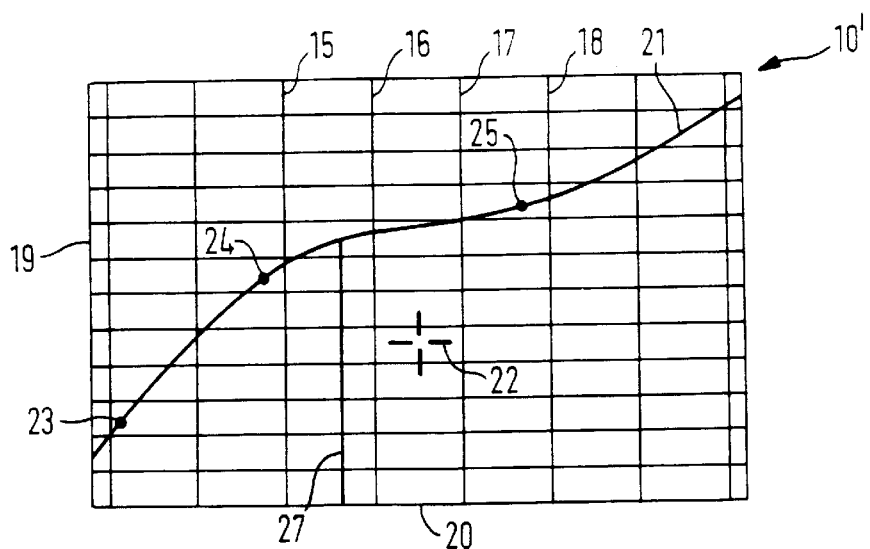
FIGS. 3 to 5 are further exemplary graphs representing the time varying function.

In order to overcome this problem the system 1 includes a graph zoom facility controlled by manipulation of the stylus on the touch tablet. FIG. 3 of the accompanying drawings shows a graph 10' representing an enlarged portion of the plot 21 shown in FIG. 2. The graph 10' comprises a vertical axis 19 with the same number of divisions as the vertical axis in the graph 10. The horizontal axis 20' of the graph 10' is, however, to a different scale than that of the axis 20 in the graph 10 and thus comprises fewer, more widely spaced divisions than the axis 20. The current position marker 27 is held in a substantially constant position (approximately ⅔ of the way along the horizontal) in both graphs 10 and 10'. The enlarged portion of the plot 21 comprises the selected points 23, 24 and 25 but the selected point 26 lies at a position outside the graph 10' and is not displayed.

Figure 4:
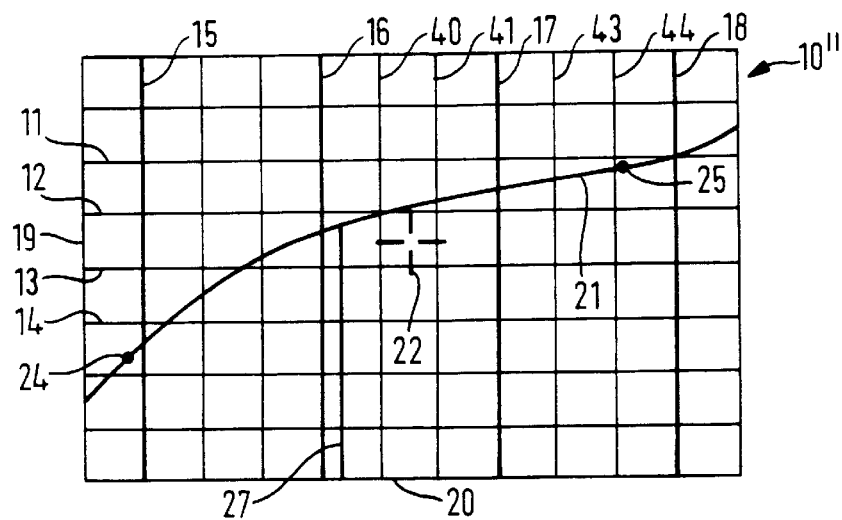

FIG. 4 of the accompanying drawings shows a graph 10" to an enlarged scale as compared with that of the graph 10'. The horizontal axis 20" of the graph 10" is to a different scale than that of the axis 20' of the graph 10'. The lines 15 to 18 are still visible but are widely spaced and the gap between adjacent lines is filled with more closely spaced lines 41 to 44. There comes a point beyond which the spacing of the lines 15 to 18 becomes sufficiently large that the displaying of the closer lines 40 to 44 is useful. For example if the distance between adjacent ones of the lines 15 to 18 represents say one hundred frames and the distance between adjacent ones of the lines 40 to 44 represents say thirty lines, then it would be useful to display the lines 40 to 44 when only three hundred frames are covered by the horizontal axis 20.

Figure 5:
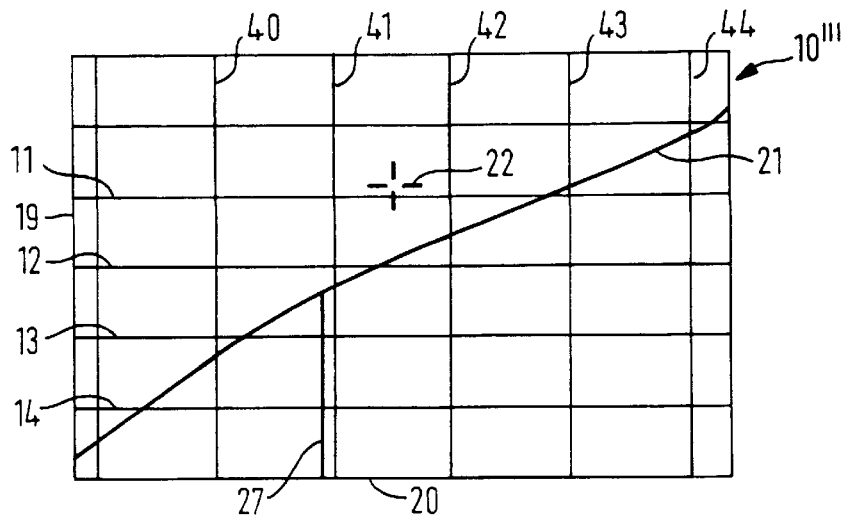

When the lines 40 to 44 are displayed on the graph, the lines 15 to 18 become redundant. As shown in FIG. 5 of the accompanying drawings if enlargement (or zooming) of the graph continues the lines 15 to 18 are removed from the display so that only the lines 40 to 44 remain. There will come a point in the zoom where the lines 40 to 44 too are inadequate and will be first supplemented and then replaced by more closely spaced lines (not shown).

While there is no corresponding substantial change in the scale of the vertical axis, it should be noted that in FIGS. 3 to 5 the spacing between the lines 11 to 14 is varied with the zoom so as to make the best use of the vertical axis. In each of FIGS. 3, 4 and 5 the scale of the vertical axis 19 is such that the plot 21 extends across the substantial portion of the axis.

Returning now to FIG. 1, the system 1 further comprises a grid sizes register 48 and a fade point register 49 containing data which enables the graph data processor 30 to effect the above described changes to the lines 15 to 18 and 40 to 44 during the zoom process. When the cursor 22 is positioned on the displayed graph away from the plot 21 and current position marker 27, the control processor 3 is arranged to respond to vertical movement of the stylus on the touch tablet by generating zoom factor data for the register 34. Movement of the stylus up the touch tablet causes the zoom factor to be increased and movement down causes the factor to be reduced. The graph data processor 30 uses the data from the zoom factor register 34 together with the data from the display area, grid sizes and fade points registers 35, 48 and 49 to calculate which lines 15 to 18 and/or 40 to 44 to display on the graph.

The processor 30 also uses the data in the marker position register 32 to determine which portion of the plot 21 to display on the graph. The processor 30 is arranged to select the portion of the plot 21 that when displayed will result in the marker 27 being maintained in a substantially constant position. The processor 30 is arranged also to examine the values of the plot 21 at the left and right boundaries of the graph and to adjust the spacing between the horizontal lines 11 to 14 so that the vertical axis is shown at the optimum scale to represent the plot.

Zooming of the graph is a dynamic effect and provides interaction for the user. As the user moves the stylus up and down the user is able to see the displayed graph zooming in or out. In order to avoid step changes between one set of vertical lines 15 to 18 and the next 40 to 44 when the change over point is reached, the graph data processor 30 is arranged to begin fading out one set of lines 15 to 18 so that they are no longer visible at the change over point and to begin fading in the other set of lines 40 to 44 so that they are visible by the time that the previous set has disappeared.

Having thus described the present invention by reference to preferred embodiments it is to be well understood that the embodiments in question are exemplary only and that modi- fications and variations such as will occur to those possessed of appropriate knowledge and skills may be made without departure from the spirit and scope of the invention as set forth in the appended claims and equivalents thereof.

What is claimed is:

1. A video image processing apparatus for processing frames of a video clip, the apparatus comprising:

a monitor;

a user operable input device; and a processor responsive to said user operable input device for generating data representing a time-based function defining the manner in which a parameter of the video clip varies within the time of the clip, for generating data for display on the monitor of a graph representing the plot of the function, and for manipulating the graph data for display so as to zoom into or out from a portion of the plot including a point of area of interest in the graph.

2. An apparatus as claimed in claim 1, wherein the processor is responsive to said user operable input device for manipulating the plot as displayed so as to change the manner in which the parameter varies over time.

3. An apparatus as claimed in claim 1, wherein the processor is arranged to generate data for display on the graph of a first time scale comprising plural lines and to generate data for display on the graph of a second time scale comprising plural lines in place of the first time scale in response to the zooming into or out from the graph.

4. An apparatus as claimed in claim 3, wherein the processor is arranged to replace the first time scale with the second time scale when a predetermined point in the zoom is reached.

5. An apparatus as claimed in claim 3, wherein the processor is arranged to replace the first time scale with the second time scale by fading between the scales.

6. An apparatus as claimed in claim 1, wherein the processor is arranged to generate data representing a current frame marker and to output the data for display of the marker on the graph.

7. An apparatus as claimed in claim 6, wherein the processor is responsive to manipulation of the user operable input device to vary the position of the current frame marker on the graph.

8. An apparatus as claimed in claim 6, wherein the processor is arranged to output data for display of the frame corresponding to that identified by the position of the current frame marker on the graph.

9. An apparatus as claimed in claim 6, wherein the processor is arranged to maintain the current frame marker at a substantially constant position on the graph as displayed on the monitor during the zooming into or out from the graph.

10. An apparatus as claimed in claim 1, wherein the processor is arranged to generate data for display on the graph of a parameter scale comprising plural lines, and to vary the spacing between the lines during the zooming into or out from the graph so that the portion of the plot extends over a substantial part of the parameter scale.

11. A video image processing method for processing frames a video clip, the method comprising:

generating data representing a time-based function defining the manner in which a parameter of the video clip varies within the time of the clip, generating data for display of a graph representing the plot of the function, and manipulating the graph data for display so as to zoom into or out from a portion of the plot including a point of area of interest in the graph.

12. A method as claimed in claim 11, further comprising manipulating the plot as displayed so as to change the manner in which the parameter varies over time.

13. A method as claimed in claim 11, further comprising generating data for display on the graph of a first time scale comprising plural lines and generating data for display on the graph of a second time scale comprising plural lines in place of the first time scale during the zooming into or out from the graph.

14. A method as claimed in claim 13, further comprising replacing the first time scale with the second time scale when a predetermined point in the zoom is reached.

15. A method as claimed in claim 13, further comprising replacing the first time scale with the second time scale by fading between the scales.

16. A method as claimed in claim 11, further comprising generating data representing a current frame marker and outputting the data for display of the marker on the graph.

17. A method as claimed in claim 16, further comprising varying the position of the current frame marker on the graph.

18. A method as claimed in claim 16, further comprising outputting data for display of the frame corresponding to that identified by the position of the current frame marker on the graph.

19. A method as claimed in claim 16, further comprising maintaining the current frame marker at a substantially constant position on the graph as displayed on the monitor during the zooming into or out from the graph.

20. A method as claimed in claim 11, further comprising generating data for display on the graph of a parameter scale comprising plural lines, and varying the spacing between the lines during the zooming into or out from the graph so that the portion of the plot extends over a substantial part of the parameter scale.

21. A system in which a graph representing a function is displayable and a zooming operation can be performed into and out from the graph, the graph fading between one scale and another during the zooming operation.

* * * * *